(12) United States Patent
Hunter

(10) Patent No.: US 6,801,968 B2
(45) Date of Patent: *Oct. 5, 2004

(54) STREAMING-MEDIA INPUT PORT

(75) Inventor: Kurt M. Hunter, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/713,287

(22) Filed: Nov. 14, 2003

(65) Prior Publication Data

US 2004/0103227 A1 May 27, 2004

Related U.S. Application Data

(63) Continuation of application No. 09/608,336, filed on Jun. 29, 2000, now Pat. No. 6,675,241.

(51) Int. Cl.$^7$ .............................................. G06F 13/14
(52) U.S. Cl. ..................... 710/65; 709/102; 709/231; 370/465; 370/536
(58) Field of Search ........................... 710/65; 709/102, 709/231; 370/465, 536

(56) References Cited

U.S. PATENT DOCUMENTS

| | | | | |
|---|---|---|---|---|
| 5,724,070 A | * | 3/1998 | Denninghoff et al. ....... | 345/547 |
| 6,314,466 B1 | * | 11/2001 | Agarwal et al. ............ | 709/231 |
| 6,381,249 B1 | * | 4/2002 | Chan et al. ................. | 370/465 |
| 6,504,993 B1 | * | 1/2003 | Matsumoto .................. | 386/95 |
| 6,525,746 B1 | * | 2/2003 | Lau et al. ................... | 345/725 |
| 6,553,566 B1 | * | 4/2003 | Grant et al. ................. | 725/28 |
| 6,560,577 B1 | * | 5/2003 | Gilbert et al. .............. | 704/500 |

* cited by examiner

*Primary Examiner*—A. Elamin
(74) *Attorney, Agent, or Firm*—Lee & Hayes, PLLC

(57) ABSTRACT

The streaming-media input port provides an inexpensive way to get a video signal from an audio/video device (such as a camcorder) into a personal computer in a convenient streamable media format (e.g., Windows Media Format). This streaming-media input port is an external hardware device that captures media content (i.e., video and audio) input, compresses it, converts it to an immediately streamable media (ISM) format, and sends it to a coupled computer for immediate storage or use. Such a use is transmission over the Internet to a streaming media player. This use allows for a "live" transmission from a typical analog video camera. The computer receiving media data in the ISM format from the streaming-media input port does not need to decompress and recompress the media data. It may directly save to storage or transmit to the streaming media player. It may do so without any modifications to the format of the media data.

18 Claims, 4 Drawing Sheets

STREAMING-MEDIA INPUT PORT

RELATED APPLICATIONS

This is a continuation of U.S. patent application Ser. No. 09/608,336 filed Jun. 29, 2000, which is now U.S. Pat. No. 6,675,241.

TECHNICAL FIELD

This invention relates to capturing visual and audio media. In particular, the invention relates to converting the captured media into compressed digitized media data in a media format that is immediately streamable.

BACKGROUND

Audio and video are often generically called "multimedia" or simply "media." A presently popular "media" application is to digitize audio and video clips. Typically, media is digitized using a video capture application.

A video capture application converts analog video signals, such as those generated by a video camera, into a digital format and then stores the digital video on a computer's mass storage system. Typically, video capture from analog devices requires a special video capture card that converts the analog signals into digital form and compresses the data.

Alternatively, external video capture devices exist that capture video signals from an attached camera and transfers them to a computer via a communications cable. The external video capture devices are often desirable because they are easier to install and use than internal devices. Therefore, they are usually preferred by a less-experienced computer user.

Examples of such external video capture devices include "QuickClip" by Logitech; "InVideo USB Capture" by Focus Enhancements; "InterView USB" by Interex, Inc.; and "USB Live! Video Adapter" by Nogatech Inc.

When an external device is used, the media (i.e., video and audio) signal is typically compressed within the external device before the signal is sent to the coupled computer. The signal is compressed because the communications connection between the device and the computer typically has a limited bandwidth. The computer-device interface normally cannot transmit the uncompressed media signal at the rate that the device receives the signal. Compressing the media signal allows it to flow smoothly across the limited-bandwidth connection to the computer.

If the computer-device interface was capable of transmitting the uncompressed media signal, the signal may overwhelm many existing computers. They are simply not powerful enough to process such a large amount of data in such a short time period.

Most of the conventional, external, video-capture devices use a proprietary media-compressing scheme. They proprietarily compress the media data and transmit it to the computer. The computer simply stores the proprietarily compressed media data into a file. Alternatively, using proprietary software on the computer, the media data is decompressed. After the media data is decompressed, it is recompressed and stored using a standard media file format, such as MPEG, QuickTime, or Windows Media Format (which is also called ASF for Advanced Streaming Format).

The media data is recompressed to save space on the computer's mass storage system. The media data is stored in a standard media file format so that it may usable by a large array of general-purpose media applications.

SUMMARY

The streaming-media input port provides an inexpensive way to get a video signal from an audio/video device (such as a camcorder) into a personal computer in a convenient streamable media format (e.g., Windows Media Format). This streaming-media input port is an external hardware device that captures media content (i.e., video and audio) input, compresses it, converts it to an immediately streamable media (ISM) format, and sends it to a coupled computer for immediate storage or use. Such a use is transmission over the Internet to a streaming media player. This use allows for a "live" transmission from a typical analog video camera.

The computer receiving media data in the ISM format from the streaming-media input port does not need to decompress and recompress the media data. It may directly save to storage or transmit to the streaming media player. It may do so without any modifications to the format of the media data.

DETAILED DESCRIPTION

The following description sets forth a specific embodiment of the streaming-media input port that incorporates elements recited in the appended claims. This embodiment is described with specificity in order to meet statutory enablement and best-mode requirements. However, the description itself is not intended to limit the scope of this patent. Rather, the inventor has contemplated that the claimed streaming-media input port might also be embodied in other ways, in conjunction with other present or future technologies.

Figure 1:
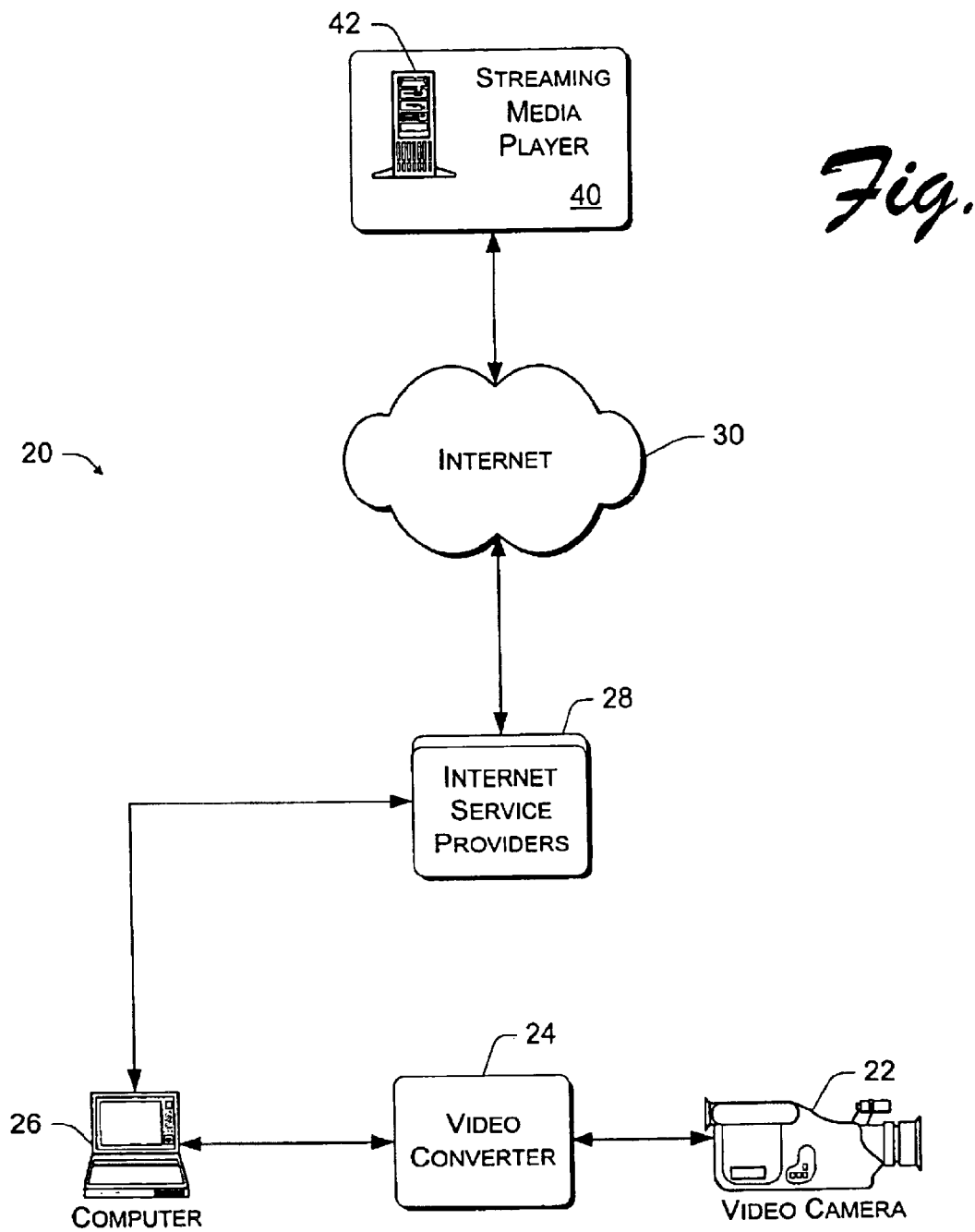
FIG. 1 is a schematic illustration of an exemplary computer network (such as the Internet) that includes a streaming media player. The network includes a computer coupled to a video camera via a video converter implementing an embodiment of the steaming-media input port.

FIG. 1 shows a computer network 20 that includes computers linked via network 30. Such a network may be a LAN, WAN, communications network, Internet, and the like. Computer 26 accesses the Internet via one or more Internet Service Providers (ISPs) 28. Computer 26 may be a conventional general-purpose personal computer, special-purpose computer, Internet appliance, or another similar device. Computer 26 may be a Web server and host a Web site.

FIG. 1 shows a video camera 22 coupled to a video converter box 24. The camera 22 is a conventional analog video camera or audio/video device (such as a camcorder). The camera 22 uses conventional coupling to connect to box 24, such as S-video, composite video and audio connections (commonly called "RCA composite jacks").

Converter box 24 has interfaces for receiving analog video and audio signals as input. It also has an interface for sending converted video signals to the computer 26. Conventional interface and communications protocol are used with the box 24.

For example, the box receives video and audio signals using S-video or RCA jacks. The box sends data to the computer via a Universal Serial Bus (USB) interface and corresponding communications protocol. Both the box 24 and the computer 26 have USB plugs for coupling them via a USB cable.

The video converter box 24 includes the components that implement the exemplary streaming-media input port. Box 24 converts analog media signals from the camera 22 into an immediately streamable media (ISM) format that is sent to the computer 26 via a USB connection. The box produces a compressed media data transmission that is in a "streamable" media format. That may alternatively be called "streaming" media format.

Streaming Media

Streaming media is a technique for transferring media data such that it can be processed as a steady and continuous stream. The importance of streaming media technologies increases with the growth of the Internet because most users do not have fast enough access to download large multimedia files quickly. With streaming media, the client browser or plug-in can start displaying the data before the entire file has been transmitted.

For streaming media to work, the client computer (such as computer 26) receiving the data must be able to collect the data and send it as a steady stream to the application that is processing the data and converting it to sound or pictures. This means that if the streaming client receives the data more quickly than required, it saves the excess data in a buffer. If the data doesn't come quickly enough, however, the presentation of the data will not be smooth.

There are a number of competing streaming technologies emerging. One of the strongest is ASF. ASF is short for Advanced Streaming Format, a streaming multimedia file format developed by the Microsoft Corporation. ASF has been submitted to ISO and IETF for standardization. ASF is also called the Windows Media Format.

Exemplary Streaming Media Player

FIG. 1 shows a streaming media player 40 coupled to the Internet 30 via one or more ISPs (not shown). The player typically is an application loaded on a computer 42. Typically, computer 42 is a client computer with a Web browser. Alternatively, computer 42 may be a server.

The player 40 receives a streaming media data over the Internet 30. Computer 26 in FIG. 1 is a Web server hosting a Web site. On that Web site is the capability of sending streaming media over the Internet 20 via its ISPs 28.

Using the video converter box 24 implementing the media input port, computer 26 sends a "live" streaming media feed to player 42. This "live" feed is from the analog video camera 22 hooked to the computer via the converter box 24.

This box 24 takes the analog media signal from the video camera 22 and digitizes it to produce digital media data. The box 24 compresses the digital media data and converts it into an immediately streamable media (ISM) format.

The computer 26 receives the compressed digital media data in the ISM format. Without any additional processing to change the format of the compressed digital media, the computer sends it over the Internet 30 to the player 40. Thus, the user of the streaming media player views the events being recorded by the camera 22 as they happen (or momentarily thereafter).

Alternatively, the computer 26 may store compressed digital media data in the ISM format. If so, the computer may store the media data in the ISM format provided by the box 24. Unlike with conventional external video capture devices, the computer 26 does not need to decompress and recompress the media data it receives from the box 24.

Components of the Video Converter Box

Figure 2:
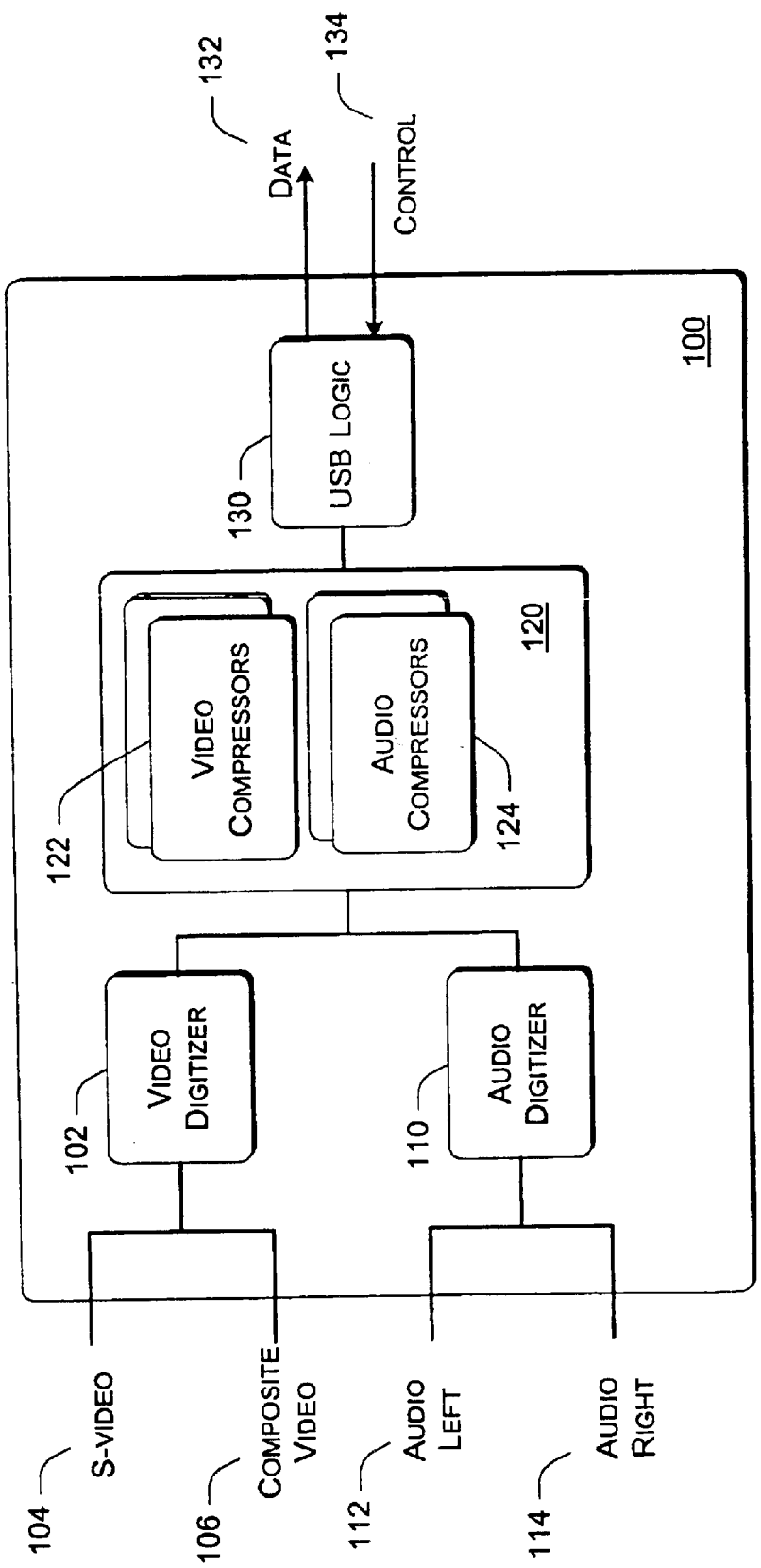
FIG. 2 is a schematic illustration of an exemplary video converter implementing an embodiment of the steaming-media input port.

FIG. 2 illustrates the components of the exemplary video converter box. The box 100 includes a video digitizer 102 for receiving a video signal via either its S-video connection 104 or its composite video connections 106. The video digitizer 102 can digitize standard analog video formats, such as NTSC and PAL.

NTSC is the abbreviation for National Television Standards Committee. The NTSC is responsible for setting television and video standards in the United States. The NTSC standard for television defines a composite video signal with a refresh rate of 60 half-frames (interlaced) per second. Each frame contains 525 lines and can contain 16 million different colors. PAL is short for Phase Alternating Line. PAL is the dominant television standard in Europe. PAL delivers 625 lines at 50 half-frames per second.

The box 100 includes an audio digitizer 110 for receiving audio signals via its left 112 and right 114 audio connections. The digitized video and audio data signals from the video and audio digitizers feed into the media data formatter 120. The formatter includes both video compressors 122 and audio compressors 124. These compressors may include a volatile or non-volatile memory.

A compressor such as these is often called a "codec" which is short for compressor/decompressor. A codec is any technology for compressing and decompressing data. Codecs may be implemented in software, hardware, firmware, or some combination. Some popular codecs for computer video include MPEG, Indeo, and Cinepak. Some popular codecs for computer audio include RealAudio and Windows Media Audio.

Although the term "codec" inherently includes a decompressor, references herein to a "codec" only require the compressor portion, but may optionally including the decompressor portion. The codecs in the exemplary media input port compresses, but it does not decompress.

Box 100 in FIG. 2 includes multiple video codecs 122 and multiple audio codecs 124. One of each is selected to do the media data compression. This selection may be done manually via a control panel on the box 100. Alternatively, this selection may be done by the computer sending a selection command to the box. In addition, the codecs may be implemented in upgradeable firmware. The computer may update the codec as needed by sending the appropriate commands and updates to the box.

The formatter 120 combines the compressed, digitized media data into a file format that is immediately streamable. An immediately streamable media (ISM) format is one that may be transmitted over a network to a streaming media player and played on that player. This transmission and playing of the ISM format is done without any intermediate processing to change the format so that it may be streamable. ASF is the ISM format used in the exemplary streaming-media input port.

FIG. 2 shows USB logic 130 coupled to the formatter 120. USB logic 130 receives the compressed, digitized media in the ISM format from the formatter 120. The USB logic provides the communications interface with the computer 26 in FIG. 1. The USB logic transmits the ISM formatted media using the USB protocol to the computer over data line 132. It receives control information from the computer over control line 134.

Exemplary Methodological Implementation

Figure 3:
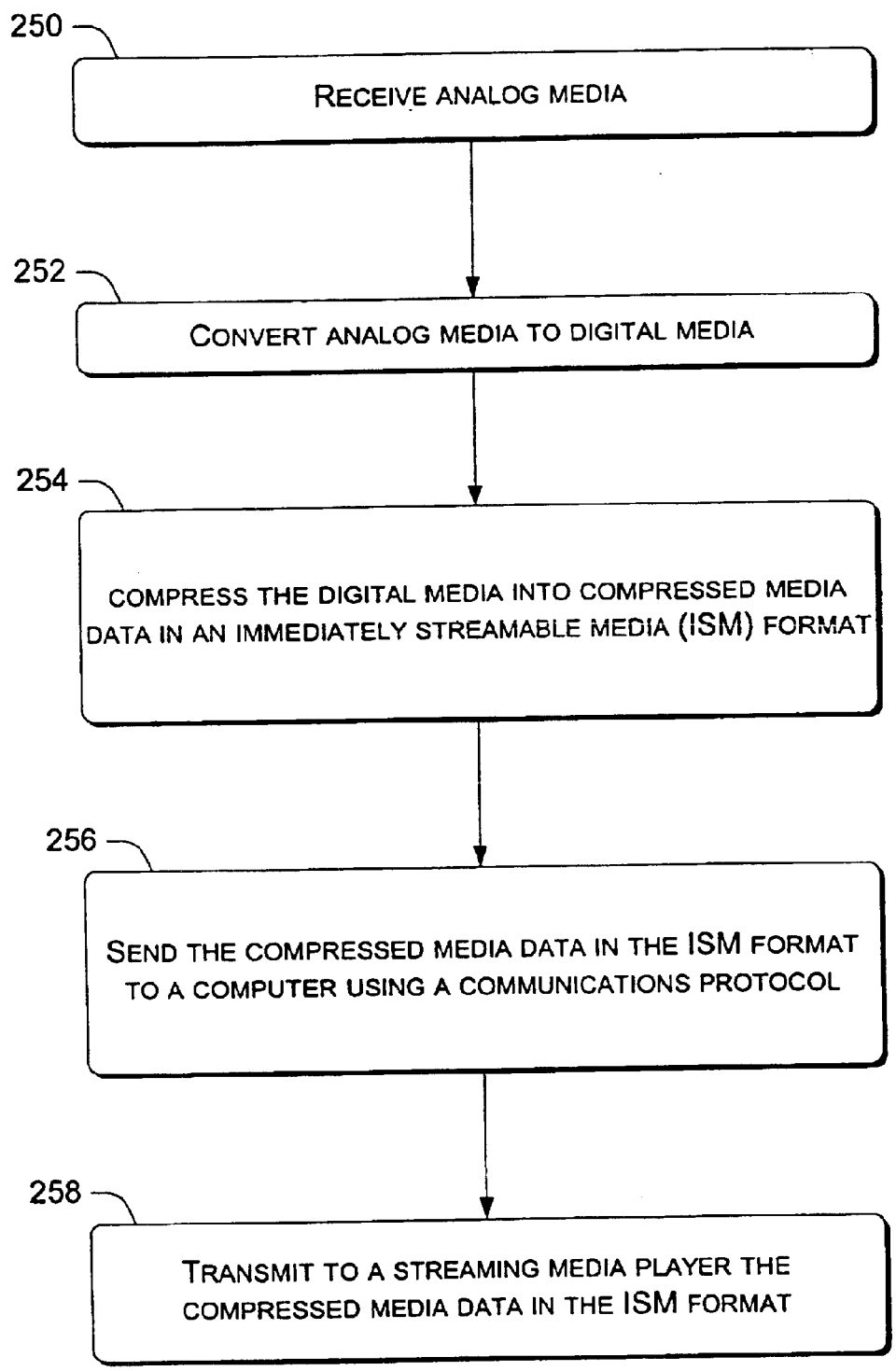
FIG. 3 is flowchart showing a process implementing the streaming-media input port.

FIG. 3 shows the exemplary methodological implementation of the streaming-media input port. At 250, the box receives analog media signal from a video camera. At 252, the box converts the analog media signal into a digital media signal.

At 254 in FIG. 3, the digital media data is compressed. Codecs accomplish this compression. Typically, the video codec is Windows Media Video and the audio codec is Windows Media Audio. Alternatively, the video codec may be any functionally similar codec, such as MPEG-4. Alternatively, the audio codec may any codec functionally similar to the Windows Media Audio. The compressed media data is formatted into an ISM format. Typically, the compressed media data is formatted in ASF.

At 256, the compressed media data in the ISM format is sent to a coupled computer via a communications interface, such as USB. At 258, the computer transmits the ISM formatted media data to a steaming media player over the Internet. The computer does this without modify the format of the media data so that player may view the data in a streaming manner.

Exemplary Computer

Figure 4:
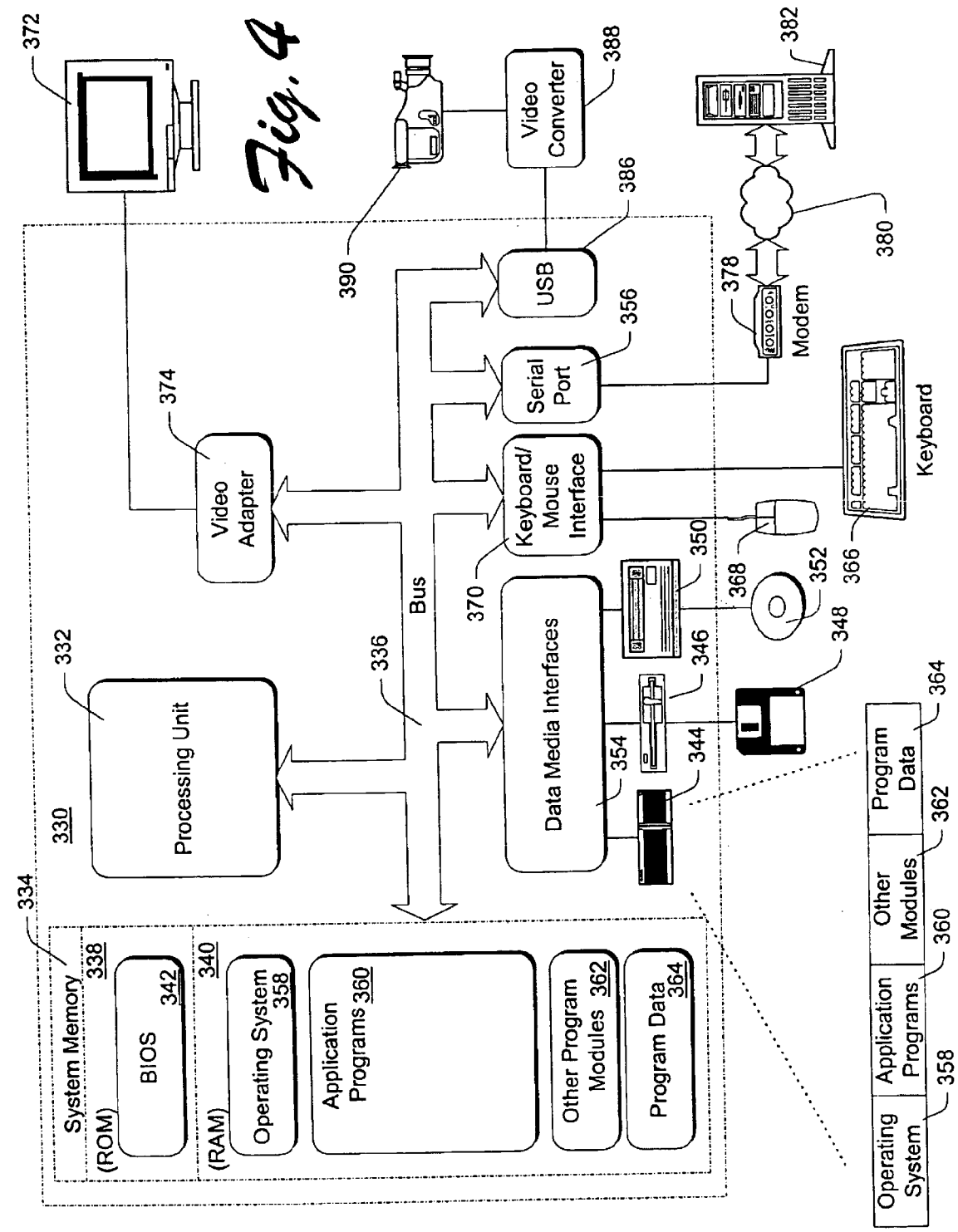
FIG. 4 is an example of a computer capable of implementing the streaming-media input port.

FIG. 4 shows an exemplary computer that may be used with the exemplary implementation of the streaming-media input port. This computer may be a client running a Web browser, a Web server, or any computer capable of connecting to a communications network (such as the Internet).

As shown in FIG. 4, computer 330 includes one or more processors or processing units 332, a system memory 334, and a bus 336 that couples various system components including the system memory 334 to processors 332. Bus 336 represents one or more of any of several types of bus structures, including a memory bus or memory controller, a peripheral bus, an accelerated graphics port, and a processor or local bus using any of a variety of bus architectures.

The system memory includes read only memory (ROM) 338 and random access memory (RAM) 340. A basic input/output system (BIOS) 342, containing the basic routines that help to transfer information between elements within computer 330, such as during start-up, is stored in ROM 338.

Computer 330 further includes a hard disk drive 344 for reading from and writing to a hard disk, not shown, a magnetic disk drive 346 for reading from and writing to a removable magnetic disk 348, and an optical disk drive 350 for reading from or writing to a removable optical disk 352 such as a CD ROM, DVD ROM or other optical media. The hard disk drive 344, magnetic disk drive 346 and optical disk drive 350 are each coupled to bus 336 by one or more interfaces 354.

The drives and their associated computer-readable media provide nonvolatile storage of computer readable instructions, data structures, program modules, and other data for computer 330. Although the exemplary environment described herein employs a hard disk, a removable magnetic disk 348 and a removable optical disk 352, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 348, optical disk 352, ROM 338, or RAM 340, including an operating system 358, one or more application programs 360 (such as a Web browser), other program modules 362, and program data 364. A user may enter commands and information into computer 330 through input devices such as keyboard 366 and pointing device 368. Other input devices (not shown) may include a microphone, joystick, game pad, satellite dish, scanner, or the like. These and other input devices are coupled to the processing unit 332 through an interface 370 that is coupled to bus 336.

A monitor 372 or other type of display device is also coupled to bus 336 via an interface, such as a video adapter 374. In addition to the monitor, personal computers typically include other peripheral output devices (not shown) such as speakers and printers.

Computer 330 can operate in a networked environment using logical connections to one or more remote computers, such as a Web server 382. Web server 382 typically includes many or all of the elements described above relative to computer 330.

A logical connection that is not depicted in FIG. 4 is a local area network (LAN) via a network interface and a general wide area network (WAN) via a modem 378. Such networking environments are commonplace in offices, enterprise-wide computer networks, intranets, and the Internet.

Depicted in FIG. 4, is a specific implementation of a WAN via the Internet. Over the Internet, computer 330 typically includes a modem 378 or other means for establishing communications over the Internet 380. Modem 378, which may be internal or external, is coupled to bus 336 via interface 356.

In a networked environment, program modules depicted relative to the personal computer 330, or portions thereof, may be stored in the remote memory storage device. It will be appreciated that the network connections shown and described are exemplary and other means of establishing a communications link it between the computers may be used.

Computer 330 connects to other peripheral devices via a Universal Serial Bus (USB) interface 386. In FIG. 4, a video converter 388 is coupled to the USB interface 386. A camera 390 is coupled to the USB interface 286 via the video converter 388.

Computer-Executable Instructions

An implementation of the streaming-media input port may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Computer Readable Media

An implementation of the streaming-media input port may be stored on or transmitted across some form of computer readable media. Computer readable media can be any available media that can be accessed by a computer. By way of example, and not limitation, computer readable media may comprise computer storage media and communications media.

Computer storage media include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Communication media typically embodies computer readable instructions, data structures, program modules, or other data in a modulated data signal such as carrier wave or other transport mechanism and included any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Conclusion

Although the streaming-media input port has been described in language specific to structural features and/or methodological steps, it is to be understood that the streaming-media input port defined in the appended claims is not necessarily limited to the specific features or steps described. Rather, the specific features and steps are disclosed as preferred forms of implementing the claimed streaming-media input port.

What is claimed is:

1. A media converter comprising:
   a media compressor configured to receive uncompressed, digitized media data and further configured to compress and format the uncompressed media data into a compressed and immediately streamable media (ISM) format; and
   a computer interface, coupled to the compressor, configured to receive the media data in the ISM format and to transmit it to a computer using a communications protocol, wherein the computer interface comprises a wireless input/output (I/O) device and the communications protocol is a wireless protocol;
   the ISM format being a media format that is acceptable and playable by a streaming media player on a computer without any additional format modifications and the ISM format being a media format that is transmittable over a network coupled to the computer without any additional format modifications.

2. A converter as recited in claim 1 further comprising a media analog/digital (A/D) converter coupled to media compressor for sending digitized media to the compressor.

3. A converter as recited in claim 1, wherein the compressor comprises an updateable nonvolatile memory that may be modified by the computer.

4. A converter as recited in claim 1, wherein the compressor comprises multiple compressors that are selectable by a user.

5. A converter as recited in claim 1, wherein the compressor comprises multiple compressors that are selectable by the computer.

6. A converter as recited in claim 1, wherein the ISM format of the compressed media data is in Advanced Streaming Format (ASF).

7. A converter as recited in claim 1, wherein the ISM format of the compressed media data is in Windows Media Format.

8. A media conversion method comprising:
   obtaining uncompressed, digitized media data;
   compressing and formatting the uncompressed media data into a compressed and immediately streamable media (ISM) format; and
   sending the compressed media data in the ISM format to a computer by using a wireless communications protocol over a wireless communications protocol interface;
   the ISM format being a media format that is acceptable and playable by a streaming media player on a computer without any additional format modifications and the ISM format being a media format that is transmittable over a network coupled to the computer without any additional format modifications.

9. A method as recited in claim 8 further comprising converting analog media into digital media for compressing.

10. A method as recited in claim 8, wherein the ISM format of the compressed media data is in Advanced Streaming Format (ASF).

11. A method as recited in claim 8, wherein the ISM format of the compressed media data is in Windows Media Format.

12. A computer-readable medium having computer-executable instructions that, when executed by a computer, performs the method as recited in claim 8.

13. A computer-readable medium having computer-executable instructions that, when executed by a computer, performs the method comprising:
   obtaining uncompressed, digitized media data;
   compressing and formatting the uncompressed media data into a compressed and immediately streamable media (ISM) format; and
   sending the compressed media data in the ISM format to a computer by using a wireless communications protocol over a wireless communications protocol interface;
   the ISM format being a media format that is acceptable and playable by a streaming media player on a computer without any additional format modifications and the ISM format being a media format that is transmittable over a network coupled to the computer without any additional format modifications.

14. A medium as recited in claim 13, wherein the method further comprising converting analog media into digital media for compressing.

15. A method as recited in claim 8 further comprising, with a streaming media player on the computer, playing the compressed media data in the ISM format without any format modifications on the computer.

16. A method as recited in claim 13, wherein the ISM format of the compressed media data is in Advanced Streaming Format (ASF).

17. A method as recited in claim 13, wherein the ISM format of the compressed media data is in Windows Media Format.

18. A converter as recited in claim 1, wherein the streaming media player is the end consumer of transmitted ISM-formatted media data, thus does not further transmit the media data.

* * * * *